United States Patent [19]

Meginnis

[11] 4,182,179

[45] Jan. 8, 1980

[54] SIGHT GLASS ASSEMBLY

[76] Inventor: Charles E. Meginnis, 529½ Nancy St., Charleston, W. Va. 25302

[21] Appl. No.: 878,189

[22] Filed: Feb. 14, 1978

[51] Int. Cl.² .............................................. G01F 23/02
[52] U.S. Cl. ...................................... 73/334; 73/330; 220/82 A; 277/34.3; 277/226
[58] Field of Search ..................... 73/334, 330, 331; 277/34.3, 34.6, 102, 226; 220/82 A, 232; 350/319

[56] References Cited

U.S. PATENT DOCUMENTS

| | | | |
|---|---|---|---|
| 794,987 | 11/1904 | Kneuper | 277/226 X |
| 983,423 | 2/1911 | Brelle | 277/226 X |
| 2,700,196 | 1/1955 | Panhard | 277/34.3 X |
| 2,893,060 | 7/1959 | Wills | 277/34.3 X |
| 3,013,433 | 12/1961 | Miller et al. | 73/330 |
| 3,178,779 | 4/1965 | Clark et al. | 220/232 X |
| 3,380,303 | 4/1968 | LeRoy | 73/330 X |
| 3,773,338 | 11/1973 | Fidler et al. | 277/34.3 X |
| 3,922,999 | 12/1975 | Meginnis | 350/319 X |
| 3,942,881 | 3/1976 | Meginnis | 350/319 |
| 4,037,471 | 7/1977 | Okamoto et al. | 73/334 X |

*Primary Examiner*—Daniel M. Yasich
*Attorney, Agent, or Firm*—Ward, Lalos, Leeds, Keegan & Lett

[57] ABSTRACT

A sight glass assembly including a housing structure mountable on a vessel for containing fluid, the housing structure having an opening therethrough, the opening having an enlarged section providing a shoulder, a face plate having an opening registered with the opening in the housing structure, mounted on the housing structure so that a portion thereof is disposed in opposed relation to the shoulder, a lens disposed in the enlarged section of the opening in the housing structure and interposed between the shoulder and the portion of the face plate, a packing member disposed in the enlarged section of the opening between the housing structure and the periphery of the lens, the packing member being hollow and filled with a fluid and means for securing the face plate to the housing structure and applying a force on the packing member causing the packing member to exert a uniform compressive force about the periphery of the lens and effect the seal between the housing structure and the periphery of the lens.

11 Claims, 7 Drawing Figures

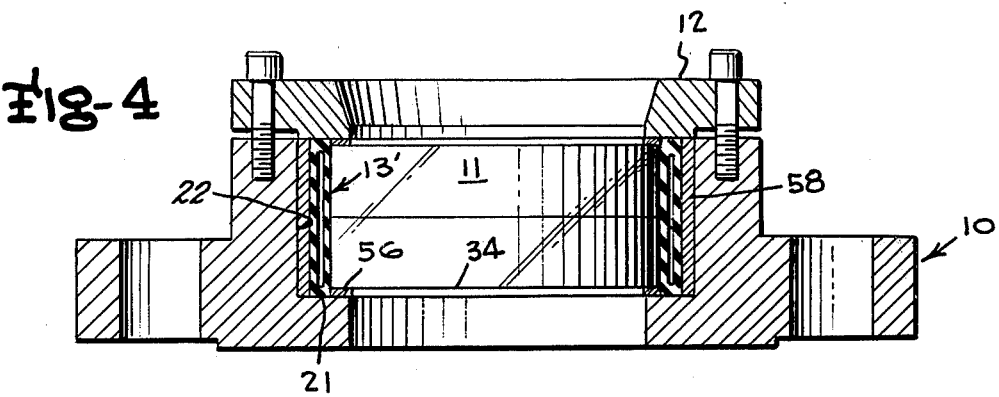
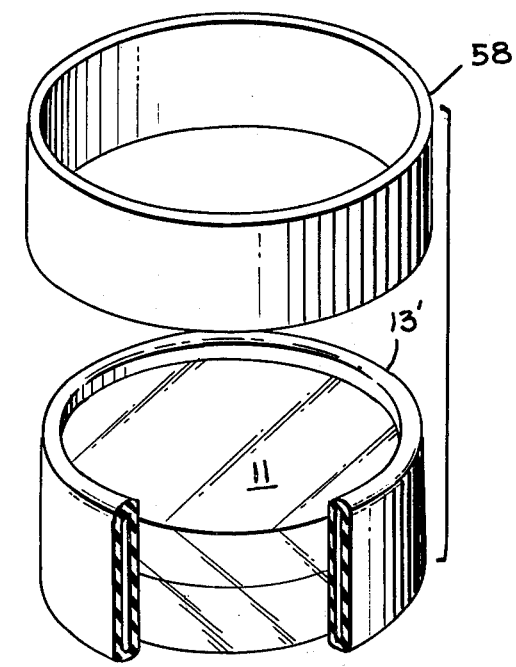
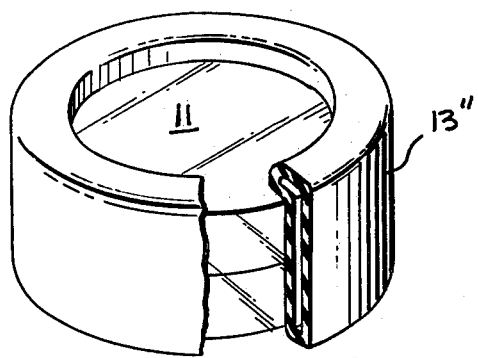
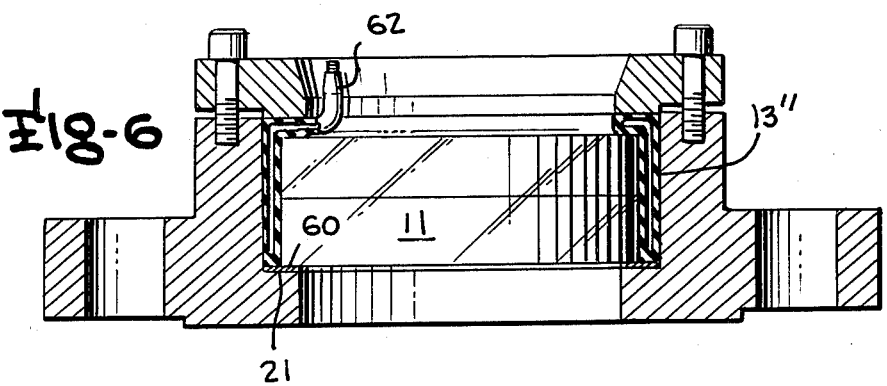

SIGHT GLASS ASSEMBLY

The present invention relates to a sight glass assembly, and more particularly to a sight glass assembly suitable for use with a large vessel containing fluid under pressure.

In the prior art, there has been developed a type of sight glass assembly which generally includes a housing structure having an opening therethrough, which is adapted to be mounted across an opening in the pressure vessel, and a lens mounted in the opening of the housing structure. In this particular type of sight glass assembly, it has been found that the principle source of failure has consisted of fracture of the lens resulting in leakage or possible blowout. Such cause of sight glass failure greatly has been obviated in prior art sight glass designs wherein a packing member is provided in the wall of the housing opening and the periphery of the lens, which packing is placed under compression causing it to expand laterally and correspondingly place the lens in radial compression and form a tight seal between the lens and the housing structure. It has been found to be desirable, however, to provide such a type of assembly which can apply uniform radial compression to the lens while being more economical in manufacture and highly effective in performance and reliability.

Accordingly, it is the primary object of the present invention to provide an improved sight glass assembly.

Another object of the present invention is to provide an improved sight glass assembly for use in vessels containing fluid under pressure.

A still further object of the present invention is to provide an improved sight glass assembly utilizing a hollow fluid filled packing member disposed between a lens and a housing in which such a lens is mounted, which cooperates with other components of the assembly to place the lens under uniform radial compression thus preventing fracturing and blowout of the lens and to form a fluid tight seal between the lens and the housing structure thereof.

A further object of the present invention is to provide an improved sight glass assembly utilizing a hollow fluid filled resilient packing member interposed between a lens and the housing member in which the lens is mounted, which cooperates with other components of the assembly to place the lens in uniform radial compression and to form a fluid tight seal between the lens and the housing structure, which is simple in design, more economically manufactured, and highly effective in performance and reliability.

Another object of the present invention is to provide an improved sight glass assembly including a fluid filled packing member which is capable of compensating for misalignment and variations in dimensions of a lens and housing member in which the lens is mounted which cooperates with the packing member to apply uniform radial compression to the lens.

Other objects and advantages of the present invention will become apparent to those persons of ordinary skill in the art to which the present invention pertains, from the following description taken in conjunction with the accompanying drawings, wherein:

FIG. 4 is a cross-sectional view similar to FIG. 2 showing an alternative embodiment;

FIG. 5 is a fragmentary perspective view of the lens, packing member and liner illustrated in FIG. 4;

FIG. 6 is a cross-sectional view similar to FIG. 2 showing a second alternative embodiment of the invention; and FIG. 7 is a perspective fragmentary view showing the packing member of the embodiment shown in FIG. 6 mounted on the lens.

Figure 1:
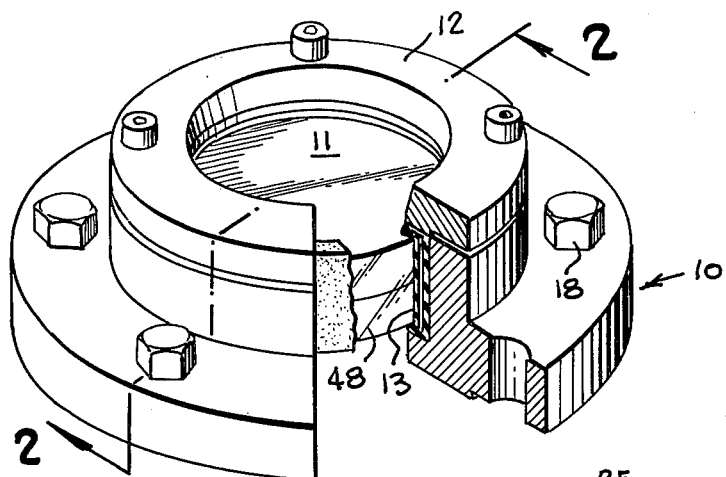
FIG. 1 is a fragmentary perspective view of an embodiment of the invention.
Figure 2:
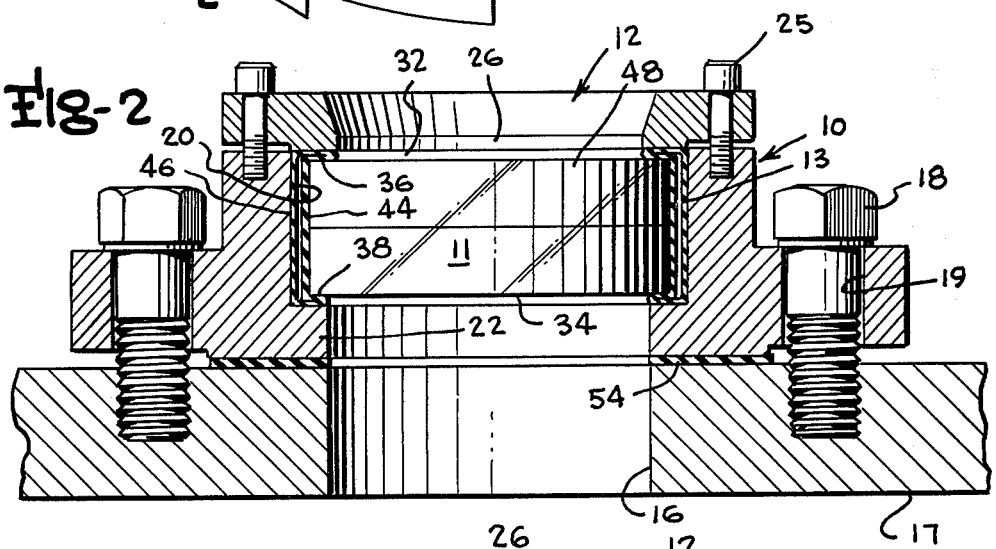
FIG. 2 is an enlarged cross-sectional view taken along lines 2—2 in FIG. 1.
Figure 3:
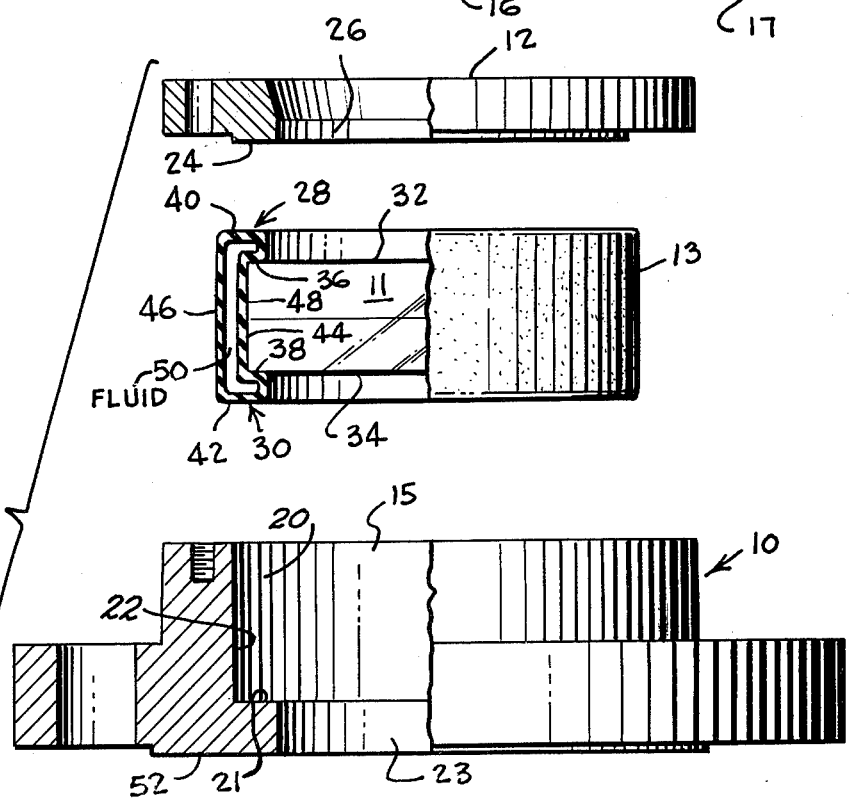
FIG. 3 is a fragmentary exploded side elevational view of the embodiment illustrated in FIGS. 1 and 2.

The embodiment illustrated in FIGS. 1–3 generally includes a housing 10, a lens 11, a face plate 12, and a fluid filled packing member 13.

The housing structure 10 generally has an annular configuration providing an opening 15, as shown in FIG. 3, adapted to register with an opening 16 in a wall 17 of a vessel containing a fluid at an elevated differential in pressure and/or temperature. The housing structure is secured to the fluid vessel by means of a plurality of bolts 18 extending through suitable openings 19 circumferentially spaced in the housing member, which are adapted to register with threaded holes in the wall of the fluid vessel. The opening 15 in the housing structure is provided with an enlarged section 20 which provides an annular shoulder 21 and annular walls 22 and 23. The face plate 12 has an inwardly extending shoulder 24 which is movable inwardly, as suggested in FIG. 2, into the housing structure by a plurality of screws 25 which extend through circumferentially spaced openings in the face plate and are threaded into registrable threaded holes in the housing structure. An opening 26 in the face plate 12 is concentric with the opening 15 in the housing structure when the face plate is mounted by bolts 18 to the housing structure.

The fluid filled packing member 13 is annular in shape and has a substantially U-shaped cross-sectional configuration. The packing member extends around the periphery of the lens 11, as indicated in FIG. 3, and an outer leg 28 and an inner leg 30 overlap the outer surface 32 and the inner surface 34 of the lens. The outer leg 28 and inner leg 30 of the packing member 13 have inner surfaces 36 and 38 which are seated on the outer surface 32 and inner surface 34 respectively of the lens 11. Legs 28 and 30 of the packing member include outer surfaces 40 and 42 which seat against the shoulder 24 of the face place 12 and the annular shoulder 21 on the housing 10 respectively, as indicated in FIG. 2. Radial inner and outer side surfaces 44 and 46 of the packing member engage peripheral surface 48 of the lens and annular wall 22 of the housing structure as indicated in FIG. 2. Application of uniform radial compression to the lens 11 by the packing member 13 is achieved through the provision of a sealed cavity 50 within the packing member which is filled with a relatively incompressible fluid such as water, oil or any other fluid such as air which is compatible with the temperatures, pressures and materials required for a specific application. Additionally, any combination of fluids such as an incompressible fluid and a compressible fluid may be used to fill the sealed cavity to achieve any desired compressibility characteristic of the packing member.

In the assembly of the embodiment described, the housing structure is first positioned on its inner surface 52, packing member 13 is positioned around the lens 11, as shown in FIG. 3, and inserted into the opening 15 in the housing structure as shown in FIG. 2. The packing member fills the annular space between the lens and the housing structure. The face plate 12 is positioned with the inwardly extending shoulder 24 contacting the outer surface 40 of the packing member with the openings therein registered with the threaded holes in the housing structure. At this stage of assembly, due to the uncompressed condition of packing member 13, the face plate either will be spaced from or not in firm engagement with the housing structure. However, when the face plate is forced against the packing member either by the insertion of screws 25 alone or the use of a press acting on the face plate and the subsequent insertion of the screws 25, the face plate will be permanently seated in opening 15 of the housing structure and will firmly engage the packing member 13. As the face plate is forced against the packing member, the fluid within the cavity 50 of the packing member will be placed in a state of compression which will be transmitted uniformly throughout the cavity 50 to cause the packing member to expand laterally thus placing the lens in radial compression and forming a fluid tight seal between the housing structure and the lens.

To provide the desired action of the packing member to place the lens in radial compression and form a fluid tight seal between the housing structure and the lens, it generally is required only that the cross-sectional configuration of the packing member in the uncompressed state be greater than the cross-sectional area of the annular space defined by the lens surfaces, the annular housing wall 22, the shoulder 21, and the packing member engaging surface 24 of the face plate. By filling the cavity 50 with an incompressible fluid, the extent of movement of the face plate 12 necessary to achieve the desired radial compression of lens 11 can be significantly reduced since an incompressible fluid does not change its volume when compressed.

With the unit thus assembled, the assembly is mounted on the vessel wall so the lens overlies opening 16 with a suitable annular gasket 54 mounted therebetween about the periphery of opening 16. The bolt holes 19 are aligned with the threaded holes in the vessel wall and the bolts 18 are then inserted through bolt holes 19, and threaded into the threaded holes of the vessel wall and tightened to complete the mounting of the assembly.

The unit may be disassembled essentially by reversing the procedure as described. Whenever the packing member 13 requires replacement, screws 25 are removed to dismount the face plate leaving the lens and packing member free to be removed. The replacement components can then be inserted in the housing structure and secured therein in the manner previously described with a minimum of delay.

Since the housing structure should be shielded from any possible corrosive effects of the fluid within the vessel, it may be fabricated from any suitable material having sufficient strength characteristics, such as stainless steel. Housing structure 10, being constantly exposed to the interior of the fluid vessel, should be fabricated from material impervious to the effects of the fluid contained within the vessel. Preferably, the housing structure is fabricated of stainless steel or a similar suitable material. Alternatively, the face plate simply may be coated with the material which is impervious to the effects of the fluid contained within the vessel.

The packing member 13 and gasket 54 are preferably fabricated from a material impervious to the effects of the fluid within the vessel. In this regard, however, it is to be noted that the lens seating portion of the housing structure functions to inhibit the flow of fluid within the vessel into contact with the packing member. In the alternate embodiment shown in FIGS. 4 through 7, there are shown gaskets 56 and 60 formed of a suitable impervious material such as Teflon which more effectively shields the packing member from the fluid in the vessel. These gaskets could be provided with a cylindrical portion interposed between the packing member and the lens to even more effectively shield the packing member.

The alternate embodiment shown in FIGS. 4 and 5 is very similar to the embodiment shown in FIGS. 1 through 3 except that the packing 13' does not include the inner and outer legs 36 and 38 but does include the additional gasket 56 positioned between the annular shoulder 21 and the inner surface 34 of the lens 11 and includes a cylindrical outer liner 58 between the packing member 13' and annular wall 22.

The alternate embodiment of the present invention shown in FIGS. 6 and 7 is very similar to that shown in FIGS. 1 through 3 except that the packing member 13" does not include a lower leg 30 but instead has the additional gasket 60 interposed between the lens 11 and the annular shoulder 21. A filler valve 62 may be provided for pressurizing the packing member 13" with a desired fluid such as air.

From the foregoing detailed description, it will be evident that there are a number of changes, adaptations and modifications of the present invention which come within the province of those persons having ordinary skill in the art to which the aforementioned invention pertains. For example, the packing members can include a plurality of cylindrical fluid filled segments stacked to form packing members which are the equivalent of those illustrated in the drawings. It is intended that all such variations not departing from the spirit of the invention be considered as within the scope thereof as limited solely by the appended claims.

I claim:

1. A sight glass assembly comprising a housing structure mountable on a vessel for containing fluid, said housing structure having an opening therethrough, said opening having an enlarged section providing a shoulder, a lens disposed in the enlarged section of the opening in said housing structure and against said shoulder, a packing member disposed in the enlarged section of said opening between said housing structure and the periphery of said lens, said packing member having a side engageable with said shoulder and a side opposite said shoulder engageable side, said packing member being hollow sealed and at least partially filled with a fluid, and means engageable with said opposite side of said packing member for applying a force on said packing member in the direction of said shoulder for causing said packing member to exert a uniform compressive force about the periphery of said lens to place the lens in lateral compression and effect a seal between said housing structure and the periphery of said lens.

2. The sight glass assembly according to claim 1 wherein said packing member includes a filler valve to permit pressurizing of said packing member with a desired fluid.

3. A sight glass assembly comprising a housing structure mountable on a vessel for containing fluid, said housing structure having an opening therethrough, said opening having an enlarged section providing a shoulder, a face plate having an opening registered with the opening in said housing structure, mounted on said housing structure so that a portion thereof is disposed in opposed relation to said shoulder, a lens disposed in the enlarged section of the opening in said housing structure and interposed between said shoulder and said portion of said face plate, a packing member disposed in the enlarged section of said opening between said housing structure and the periphery of said lens, said packing member being hollow, sealed and least partially filled with a fluid, and means for securing said face plate to said housing structure, said securing means applying a force via said face plate on said packing member causing said packing member to exert a uniform compressive force about the periphery of said lens to place the lens in lateral compression and effect a seal between said housing structure and the periphery of said lens.

4. A sight glass assembly according to claim 3 including a first gasket interposed between said lens and said housing structure and a second gasket interposed between said lens and said face plate.

5. A sight glass assembly according to claim 3 including means for securing said housing structure to the wall of said vessel for containing a fluid, with the lens overlying an opening therein.

6. The sight glass assembly according to claim 3 wherein said packing member is formed of a compressible material and is provided with a substantially U-shaped cross-sectional configuration.

7. The sight glass assembly according to claim 3 including a liner disposed between said packing member and said housing structure and also between said packing member and said housing structure and said face plate, formed of a material impervious to the effects of the fluid contained within said vessel.

8. The sight glass assembly according to claim 3 wherein said packing member is formed of a compressible material and is provided with a substantially L-shaped cross-sectional configuration.

9. A sight glass assembly according to claim 3 wherein said packing member is formed of a compressible material and is provided with a substantially rectangular cross-sectional configuration.

10. A sight glass assembly according to claim 9 additionally including a gasket between said lens and said housing structure and a liner between said packing member and said housing structure.

11. The sight glass assembly according to claim 10 wherein the fluid contained within the packing member is formed of an incompressible material and said packing member is provided with a substantially U-shaped cross-sectional configuration with the legs of said U-shaped cross-sectional configuration extending between the face plate and the lens and between the housing structure and the lens to provide seals therebetween and permit compression of the packing member by the face plate.

* * * * *